(12) United States Patent
Yamada

(10) Patent No.: US 11,461,352 B2
(45) Date of Patent: Oct. 4, 2022

(54) INFORMATION PROCESSING APPARATUS FOR PERFORMING BATCH PROCESSING AND NON-TRANSITORY COMPUTER READABLE MEDIUM STORING PROGRAM

(71) Applicant: FUJIFILM Business Innovation Corp., Tokyo (JP)

(72) Inventor: Rei Yamada, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 136 days.

(21) Appl. No.: 16/535,049

(22) Filed: Aug. 7, 2019

(65) Prior Publication Data

US 2020/0293539 A1 Sep. 17, 2020

(30) Foreign Application Priority Data

Mar. 13, 2019 (JP) .............................. JP2019-046073

(51) Int. Cl.
*G06F 16/25* (2019.01)
*G06F 16/23* (2019.01)
(Continued)

(52) U.S. Cl.
CPC ........ *G06F 16/252* (2019.01); *G06F 16/2386* (2019.01); *G06Q 10/06* (2013.01); *G06Q 10/103* (2013.01)

(58) Field of Classification Search
CPC ... G06F 16/252; G06F 16/2386; G06Q 10/06; G06Q 10/103
See application file for complete search history.

(56) References Cited

U.S. PATENT DOCUMENTS 5,826,265 A * 10/1998 Van Huben ............. G06F 16/25
707/999.102
6,262,531 B1 * 7/2001 Inoguchi ................ H05B 33/04
313/500
(Continued)

FOREIGN PATENT DOCUMENTS

CN 109584119 A * 4/2019
JP H0554036 3/1993
(Continued)

OTHER PUBLICATIONS

Pipelining "date unknown" [captured on Mar. 6, 2014 by archive.org], Stanford, https://web.archive.org/web/20140306061640/https://cs.stanford.edu/people/eroberts/courses/soco/projects/risc/pipelining/index.html.*

(Continued)

*Primary Examiner* — Leslie Wong
(74) *Attorney, Agent, or Firm* — JCIPRNET

(57) ABSTRACT

An information processing apparatus includes a reception unit that receives plural pieces of data, a setting unit that previously sets a specific condition for each piece of data which is received or scheduled to be received by the reception unit, a storage unit that stores the specific condition set by the setting unit in association with each piece of the data which is received or scheduled to be received by the reception unit, and a processing unit that performs batch processing of plural pieces of data in a case where each data of the plural pieces of data received by the reception unit satisfies the specific condition stored in the storage unit.

20 Claims, 9 Drawing Sheets

(51) Int. Cl.
*G06Q 10/10* (2012.01)
*G06Q 10/06* (2012.01)

(56) References Cited

U.S. PATENT DOCUMENTS

| | | | | | |
|---|---|---|---|---|---|
| 8,826,281 | B2* | 9/2014 | Wing | ............... | G06F 16/93 |
| | | | | | 709/219 |
| 8,949,834 | B2* | 2/2015 | Olston | ............... | G06F 16/951 |
| | | | | | 718/101 |
| 9,589,310 | B2* | 3/2017 | Duluk, Jr. | ............... | G06F 9/3851 |
| 10,585,656 | B1* | 3/2020 | Das | ............... | G06F 9/45558 |
| 11,153,446 | B2* | 10/2021 | Murakami | ............... | H04N 1/00854 |
| 2002/0161602 | A1* | 10/2002 | Dougherty | ............... | G06Q 30/0601 |
| | | | | | 705/80 |
| 2004/0015369 | A1* | 1/2004 | Kim | ............... | G06Q 10/103 |
| | | | | | 705/301 |
| 2004/0162763 | A1* | 8/2004 | Hoskin | ............... | G06Q 20/14 |
| | | | | | 705/14.51 |
| 2005/0114243 | A1* | 5/2005 | Scumniotales | ............... | G06Q 40/00 |
| | | | | | 705/35 |
| 2006/0015416 | A1* | 1/2006 | Hoffman | ............... | G06Q 30/0605 |
| | | | | | 705/28 |
| 2006/0070019 | A1* | 3/2006 | Vishnumurty | ............... | G06Q 10/103 |
| | | | | | 717/101 |
| 2015/0172058 | A1* | 6/2015 | Follis | ............... | H04L 9/3247 |
| | | | | | 713/176 |

FOREIGN PATENT DOCUMENTS

| | | | |
|---|---|---|---|
| JP | H08286958 A | * | 2/2017 |
| WO | WO20170220005 A1 | * | 11/1996 |

OTHER PUBLICATIONS

Workflow "specific condition" Mar. 26, 2021, Google, https://www.google.com/search?q=workflow+%E2%80%9Cspecific+condition%E2%80%9D&source=Int&tbs=cdr%3A1%2Ccd_min%3A%2Ccd_max%3A3%2F13%2F2019&tbm=#spf=1616870354300.*
Workflow "specific date", Mar. 26, 2021, Google, https://www.google.com/search?q=workflow+%22specific+date%22&source=Int&tbs=cdr%3A1%2Ccd_min%3A%2Ccd_max%3A3%2F13%2F2019&tbm=#spf=1616870268666.*
Harrison et al., CDIA Training & Test Preparation Guide Specialized Solutions, pp. 68-70.*

* cited by examiner

FIG. 7

```
DOCUMENT PUBLICATION DESTINATION

[ADD FROM         ] [ADD FROM    ] [ADD MAIL  ]
  [ADDRESS BOOK     ] [HISTORY LIST] [ADDRESS   ]

☐   DOCUMENT PUBLICATION DESTINATION MAIL ADDRESS

PUBLICATION CONDITION

[SELECT ACTION  ]      [SELECT ACTION ]
  [TARGET USER    ]      [CONTENT       ]

☐   ACTION TARGET USER    ACTION CONTENT

PUBLICATION CONDITION (ADMINISTRATOR)

☐ THERE IS FINAL CHECK    ☐ THERE IS NO FINAL CHECK OF
    OF ADMINISTRATOR          ADMINISTRATOR

TRANSMISSION MAIL NAME

[DOCUMENT IS PUBLISHED BY MR. FUJI TARO]
```

FIG. 8

```
SELECT ACTION CONTENT

☐   VERSION UPGRADE

☐   CONTENT DIFFERENCE    [REVIEW STATUS]

☐   SETTING CHANGE        [REVIEW STATUS]

☐   APPROVAL MARK

[CANCEL]   [OK]
```

FIG. 9

PUBLICATED NOW
RECEIVING
END OF RECEPTION
PUBLICATION HOLDING STATUS

| NAME | PUBLICATION RESERVATION DATE | PUBLICATION DEADLINE DATE | PUBLICATION DEADLINE | PROGRESS RATE |
|---|---|---|---|---|
| ... | ....... | ........ | ..... | 80% DETAIL DISPLAY |
| ... | ....... | ........ | ..... | 60% |
| ... | ....... | ........ | ..... | 10% |

FIG. 10

PUBLICATED NOW
RECEIVING
END OF RECEPTION
PUBLICATION HOLDING STATUS

| | NAME | PUBLICATION DESTINATION | PUBLICATION CONDITION | DETERMINATION |
|---|---|---|---|---|
| ☐ | ... | ... | VERSION UPGRADE | COMPLETION |
| ☐ | ... | ... | APPROVAL MARK | COMPLETION |
| ☐ | ... | ... | VERSION UPGRADE | UNCOMPLETION |

DETAIL DISPLAY
PUBLICATION APPROVAL

REMINDER NOTIFICATION TO ACTION TARGET USERS

FIG. 13

ADD STORAGE SCHEDULED DOCUMENTS

FILE NAME

USER WHO STORE DOCUMENT

| ADD FROM ADDRESS BOOK | ADD FROM HISTORY LIST | ADD FROM MAIL ADDRESS |

☐ DOCUMENT PUBLICATION DESTINATION MAIL ADDRESS

CANCEL   OK

FIG. 14

UPLOAD DOCUMENT REQUESTED TO BE STORED

FILE NAME  [CHOICE]

DOCUMENT NAME HAS BEEN SPECIFIED.
PLEASE UPLOAD WITH FOLLOWING NAME.

DOCUMENT SCHEDULED TO BE STORED. txt

* IF NAME IS DIFFERENT, YOU CANNOT UPLOAD.

YOU CAN UPLOAD FILES BY DROPPING HERE

CANCEL   REGISTRATION

INFORMATION PROCESSING APPARATUS FOR PERFORMING BATCH PROCESSING AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2019-046073 filed Mar. 13, 2019.

BACKGROUND

(i) Technical Field

The present invention relates to an information processing apparatus and a non-transitory computer readable medium storing a program.

(ii) Related Art

JP1993-054036A discloses a document processing apparatus including a storage unit that stores a document and a processing condition for controlling execution of processing on the document, a plurality of processing execution units that respectively execute predetermined processing, an instruction unit that instructs execution of processing selected from the plurality of processing execution units on a document stored in the storage unit, a verification unit that verifies whether or not a user who performs an instruction by using the instruction unit and the instructed processing satisfy a processing condition stored in the storage unit together with a document to become a target of instructed processing, and a unit that controls execution of the processing instructed by the instruction unit according to a verification result of the verification unit. Thereby, when a plurality of people work together, it is possible to perform a detailed management to allow/reject only specific processing only for a specific person, to immediately grasp a work progress status of each person by notification, and to perform promptly co-management for deciding allowance/rejection by decision-making of a related person.

SUMMARY

A plurality of users may commonly process a plurality of pieces of data, and when each data satisfies each condition, batch processing may be performed on the plurality of data. In this case, after the user confirms a progress status of each data one by one and confirms that all the plurality of pieces of data satisfy the respective conditions, the batch processing has to be performed on the plurality of pieces of data. In order to perform the batch processing on the plurality of pieces of data, accessing each data and confirming the progress status thereof may be a cumbersome work for the user.

An aspect of non-limiting embodiments of the present disclosure relate to an information processing apparatus and a non-transitory computer readable medium storing a program that reduce an operation for a user to confirm a progress status of each data in a case where batch processing is performed on a plurality of pieces of data when each data of a plurality of pieces of predetermined data satisfies each specific condition, rather than a case where the user accesses each data to confirm the progress status.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a reception unit that receives a plurality of pieces of data, a setting unit that previously sets a specific condition for each piece of data which is received or scheduled to be received by the reception unit, a storage unit that stores the specific condition set by the setting unit in association with each piece of the data which is received or scheduled to be received by the reception unit, and a processing unit that performs batch processing of a plurality of pieces of data in a case where each of the plurality of pieces of data received by the reception unit satisfies the specific condition stored in the storage unit.

BRIEF DESCRIPTION OF THE DRAWINGS

Embodiment(s) of the present invention will be described in detail based on the following figures, wherein:

FIG. 7 is a screen example (third) of the embodiment;
FIG. 8 is a screen example (fourth) of the embodiment;
FIG. 9 is a screen example (fifth) of the embodiment;
FIG. 10 is a screen example (sixth) of the embodiment;
FIG. 13 is a screen example (second) of the modification example;
and
FIG. 14 is a screen example (third) of the modification example.

DETAILED DESCRIPTION

Hereinafter, an embodiment of the invention will be described with reference to the drawings by using a server client system as an example.

Figure 1:
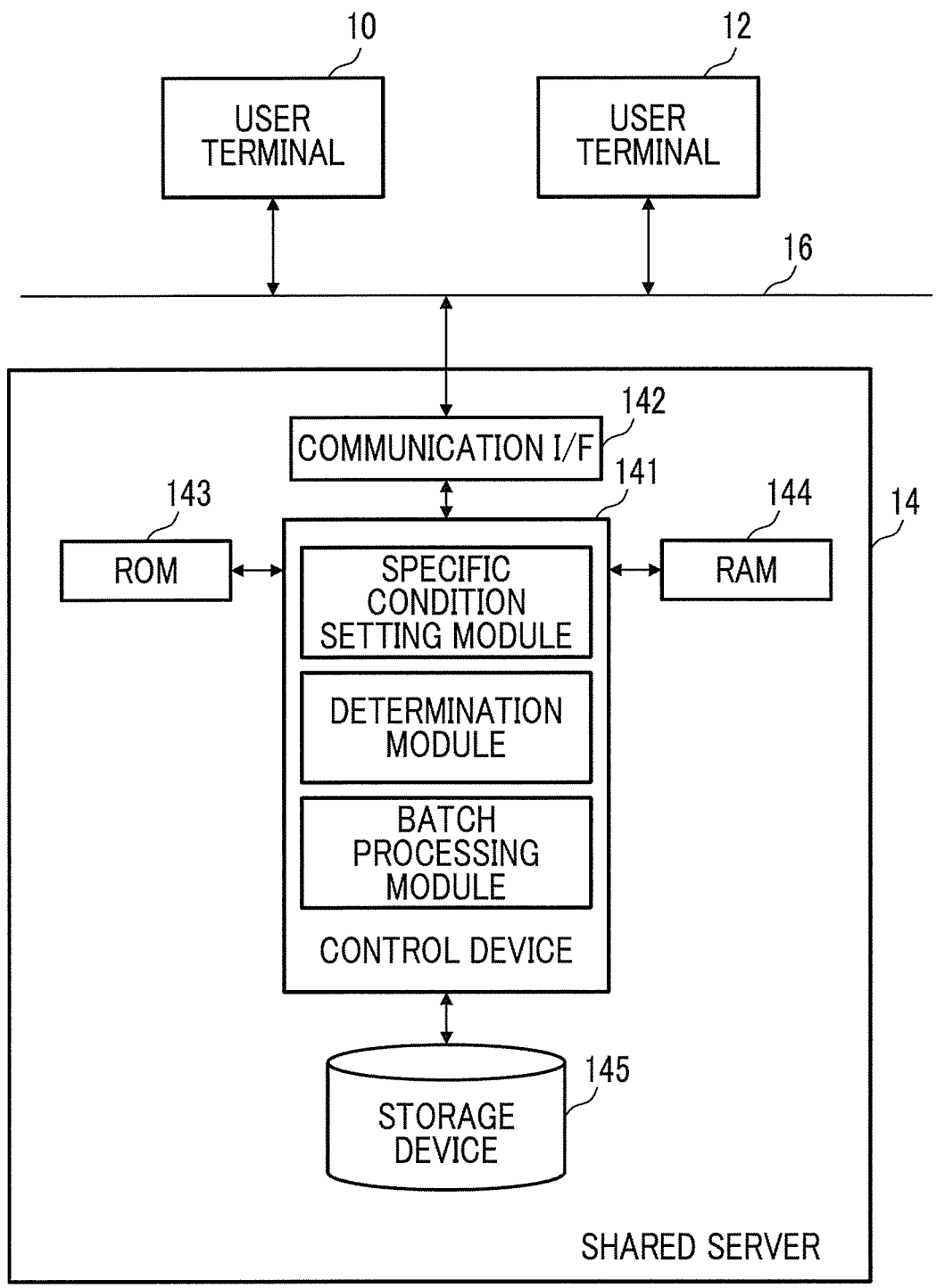
FIG. 1 is an overall configuration diagram of an embodiment.

FIG. 1 illustrates an overall configuration of an information processing apparatus according to the present embodiment. The information processing apparatus includes a user terminal 10, a user terminal 12, and a shared server 14. The user terminal 10, the user terminal 12, and the shared server 14 are connected to be able to transmit and receive data via a communication network 16. The communication network 16 may be either a public line or a dedicated line and may be either a wired line or a wireless line.

The user terminal 10 and the user terminal 12 are portable information terminals such as a personal computer (PC), a tablet terminal, or a smartphone, include a processor, a memory, an input/output device, and a communication interface (I/F), and access the shared server 14 via the communication network 16 to upload or download a file such as a document or to perform editing such as adding or deleting a file such as a document stored in the shared server 14. The file includes not only the document but also all data such as an image and a moving image.

Although two user terminals 10 and 12 are illustrated in the figure, the number of the user terminals is unselective, and only a single user terminal 10 may be connected to the communication network 16, or three or more user terminals may be connected to the communication network 16.

The shared server 14 is a server computer, and includes a control device 141, a communication interface (I/F) 142, a ROM 143, a RAM 144, and a storage device 145.

The control device 141 is configured by one or more processors, reads a processing program stored in a program memory such as the ROM 143, and realizes various types of processing by executing the processing program. A part of a function of the control device 141 may be realized not by software processing according to program execution but by hardware processing. The hardware processing may be performed by using a circuit such as an ASIC or a field programmable gate array (FPGA). The control device 141 stores a file such as a document in the storage device 145 or reads a file such as a stored document to transmit to the user terminal 10 or the user terminal 12 when receiving an upload request or a download request of a file such as a document as data from the user terminal 10 or the user terminal 12 via the communication I/F 142. The control device 141 includes a specific condition setting module a determination module, and a batch processing module as a functional module so as to perform each process. Here, the "module" means a component such as software or hardware that can be logically separated. The module may correspond 1:1 to a function, but one module may be configured by one program, or a plurality of the modules may be configured by one program. Further, the plurality of modules may be performed by one processor or by a plurality of processors in a distributed or parallel environment. In the processing performed by each module, target information is read, processing is performed by a processor such as a CPU, and then the processing result is output.

The specific condition setting module sets a specific condition for each of files received via the communication I/F 142 as a reception unit or files scheduled to be received. The specific condition is supplied from the user terminal 10 or the user terminal 12. The specific condition setting module stores the received files or the files scheduled to be received in association with the specific condition in the RAM 144 or the storage device 145. The specific condition is a condition to be satisfied when batch processing is performed for the plurality of files stored in the storage device 145 and can be set according to content of the batch processing. The contents of the batch process can include, for example, publishing by transmitting a plurality of files to a specific user by e-mail, encrypting the plurality of files, decrypting the plurality of files, changing a format of the plurality of files, compressing the plurality of files, decompressing the plurality of files, editing contents of the plurality of files, and the like. In a case where the plurality of files are published by being transmitted to a specific user by email, the specific condition can be a condition considered to be necessary for publishing to the specific user, and specifically, all files of transmission target to be transmitted by mail can be stored in the storage device 145, a work for all the files of transmission target can be completed, a final confirmation of an administrator for all the files of transmission target can be completed, and others can be per-formed. A user of the user terminal 10 or the user terminal 12 provides the specific condition setting module with a desirable specific condition.

Since the specific condition setting module stores the specific conditions for each file in association with each other, in a case where the files are different from each other, the specific conditions may be different from each other. For example, assuming that files A, B, and C exist as a plurality of files, and conditions a, b, and c exist as specific conditions, there is a pattern in which the same condition is associated with all files, that is, there may be also a case of file A→conditions a, b, c
file B→conditions a, b, c
file C→conditions a, b, c but there is a pattern in which different conditions are associated with all the files, that is, there may be also a case of file A→conditions a, b, c
file B→conditions a, b
file C→condition a.

A plurality of the specific conditions may be set for one file, or only one may be set for one file.

The specific conditions may be set according to content of the batch processing but may be exemplified as following conditions.

A file is received by the shared server 14 and stored in a specific folder of the storage device 145
The file is stored in the specific folder until a specific date
A specific work is completed by a specific user
The specific work is completed by the specific user and is confirmed by another user
There is a specific addition to the file stored in the specific folder Here, the specific work is, for example, a notification of a work completion by a specific user, a version upgrade by a specific user, or the like.

The determination module determines whether or not the specific conditions associated with each of the plurality of files of a batch process target are satisfied. In a case where it is determined that the specific conditions are satisfied in all of the plurality of files of the batch processing target, the determination module outputs a determination result to that effect to the batch processing module. In a case where the specific conditions are not satisfied in all of the plurality of files of the batch processing target but is satisfied in one of the files, the determination module calculates and outputs a ratio that is satisfied as a progress rate. Specifically, in a case where a half of the plurality of files of the batch processing target satisfies the specific conditions, the progress rate is calculated as 50% and the like. The progress rate is calculated in a range of 0% to 100%. The determination module transmits the calculated progress rate to the user terminals 10 and 12 for display. The determination module also functions as a display control module that displays the progress rate on the user terminals 10 and 12.

The batch processing module performs the batch processing according to the determination result of the determination module. That is, in a case where it is determined that all the plurality of files satisfy the specific conditions, the determination module performs batch processing for the plurality of files. The processing result may be stored in the storage device 145 and may be transmitted to the user terminal 10 or the user terminal 12 as necessary.

Next, the processing of the present embodiment will be described in more detail by using a case where the plurality of files stored in the storage device 145 are transmitted to a specific user by mail to be published as batch processing, as an example.

Figure 2:
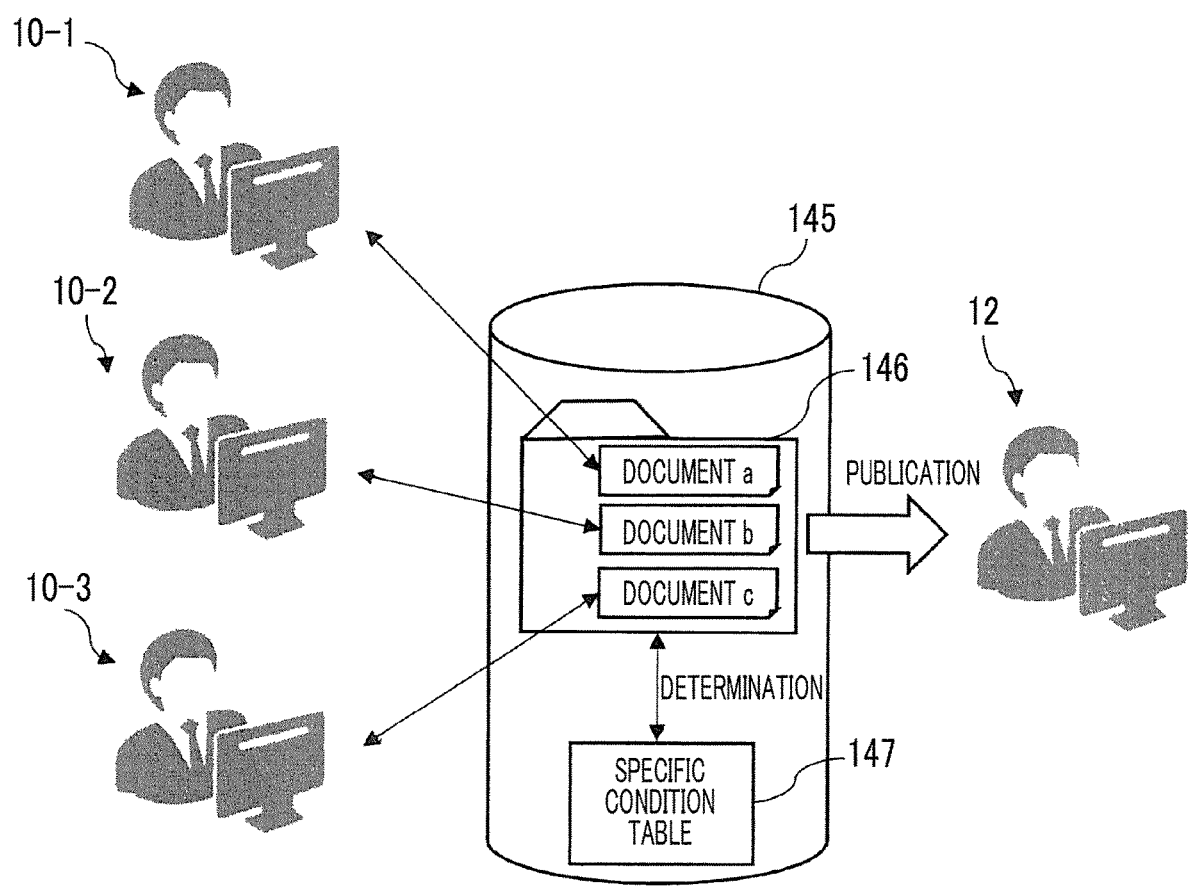
FIG. 2 is a public explanatory diagram of the embodiment.

FIG. 2 schematically illustrates processing in a case of being published as the batch processing.

User terminals 10-1, 10-2, and 10-3 are connected to the shared server 14 via the communication network 16 as the user terminal 10, and a user A, a user B, and a user C each operate the user terminals 10-1, 10-2, and 10-3, and store files such as documents in the folder 146 created in the storage device 145 of the shared server 14. The user A creates a document a, uploads the document from the user terminal 10-1, and stores the document in the folder 146, and the user B creates a document b, uploads the document from the user terminal 10-2, and stores the document in the folder 146, and the user C creates a document c, uploads the document from the user terminal 10-3, and stores the document in the folder 146. In addition, the user A downloads the document a from the folder 146, upgrades a version of the document by performing an addition in the user terminal 10-1, and uploads the document a into the folder 146 again, as necessary. The user B and the user C perform the same processing. Furthermore, an administrator of the system checks whether or not the documents a, b, and c are indeed stored in the folder 146, or whether or not versions of the documents a, b, and c are upgraded, and the like, as necessary.

The determination module of the control device 141 determines whether or not the document a, the document b, and the document c satisfy the specific conditions respectively with reference to a specific condition table 147 which is stored in the storage device 145 and in which specific conditions are associated with each of a plurality of documents.

The specific conditions respectively associated with the document a, the document b, and the document c are all the same specific conditions, and in a case where a version is upgraded, and there is a final check of the administrator, the determination module determines whether or not all the document a, the document b, and the document c satisfy these conditions. In a case where all of the documents a, b, and c satisfy these conditions, the batch processing module of the control device 141 transmits the document a, the document b, and the document c stored in the folder 146 to the specific user terminal 12 by mail to publish the documents.

Whether or not the document a, the document b, and the document c are upgraded can be determined by using upgrade information added to the respective documents. For example, in a case where the document a is upgraded, the user A adds version upgrade information to the document a as metadata and uploads the upgraded document a. The determination module determines whether or not the document a is upgraded by referring to the metadata. In a case where a document name of the document a is changed due to the version upgrade, for example, in a case where the document name is "document 1 ver 1.0" before being upgraded and the document name is "document 1 ver 1.1" after being upgraded, it can be determined whether or not the version is upgraded from the change in the document name. In a case where the document a is uploaded multiple times, it can be determined that the version is upgraded. Furthermore, in a case where the document a is uploaded multiple times and there is a content difference of the document a, it can be determined that the version is upgraded.

Whether or not the administrator performs a final check on the document a, the document b, and the document c can be determined by using the final check information added to the respective documents. For example, in a case where the administrator performs the final check on the document a, the administrator adds final check information to the document a as metadata. The determination module determines whether or not a finally check on the document a is performed by the administrator by referring to the metadata.

FIG. 2 illustrates a case where a plurality of users uploads, downloads, or upgrades the document a, the document b, and the document c, respectively, but one user may upload, download, or upgrade all of the document a, the document b, and the document c. That is, the plurality of files of a batch processing target may be a file of a single user or any one of the plurality of users.

Figure 3:
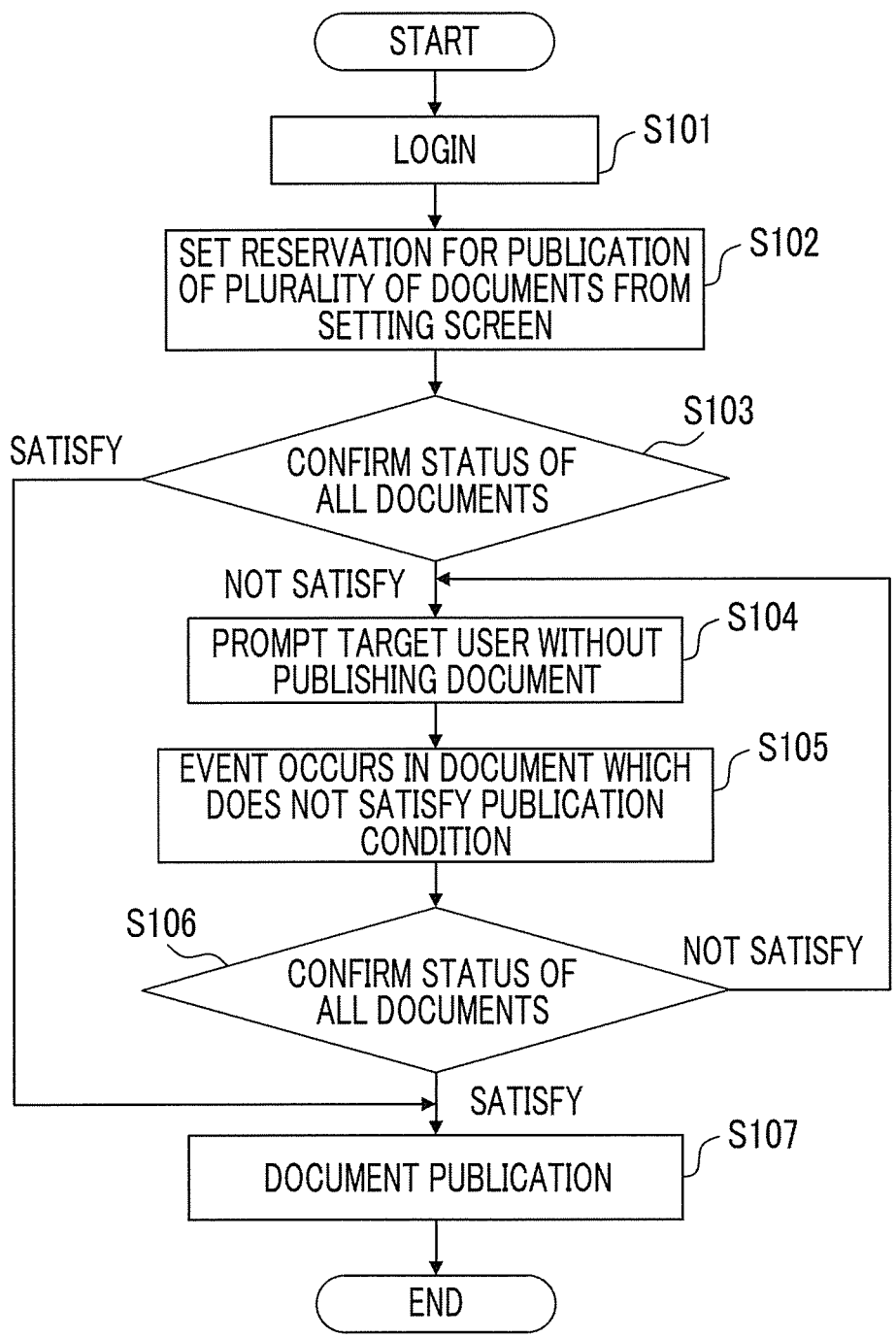
FIG. 3 is a processing flowchart (first) of the embodiment.

FIG. 3 illustrates an overall processing flowchart in a case where a plurality of documents stored in the folder 146 of the storage device 145 are published as batch processing.

First, a user logs in to the shared server 14 to enable an access to the shared server 14 (S101). An ID, a password, a biometric authentication, and the like can be used for login.

Next, a user who intends to publish operates, for example, the user terminal 10 to set a reservation for publication of the plurality of documents stored in the folder 146 from a setting screen (S102). The user may download an application program for using the shared server 14 from the shared server 14 in advance and installs the application program in the user terminal 10 and start the application program to set the reservation for publication, or may set the reservation for publication using a web application program that operates on a web browser. Setting of the reservation for publication includes a document to be published, a publication destination, and specific conditions for each document. The specific condition in this case can also be referred to as a "publication condition". The setting of the reservation for publication may further include a publication request date and a publication deadline date. The set reservation for publication is transmitted from the user terminal 10 to the shared server 14. The control device 141 of the shared server 14 stores a setting condition of the reservation for publication in the RAM 144, the storage device 145, and the like. As illustrated in the specific condition table 147 of FIG. 2, the control device 141 stores a document to be published and a specific condition for each document in association with each other. Although FIG. 2 illustrated an association between the document and the specific condition in a form of a table, the invention is not limited to this, and the document to be published and the specific condition may be associated by storing the document to be published and the specific condition in separate storage regions and by managing a correspondence relationship between both at a management table or the like.

Next, the control device 141 confirms a status of all the documents to be published (S103). That is, the determination module of the control device 141 determines whether or not the specific conditions associated with the respective documents are satisfied for all the documents to be published. At this time, the control device 141 may transmit a confirmation result of the status to the user terminal 10 as a progress rate to display the confirmation result on the user terminal 10. In a case where all the documents satisfy the specific condition ("satisfy" in S103), the progress rate is 100%, and the control device 141 transmits all the documents in the folder 146 by e-mail to a publication destination set by the reservation for publication to publish the document (S107).

Meanwhile, in a case where all the documents do not satisfy the specific condition ("not satisfy" in S103), the progress rate is lower than 100%, and the control device 141 prompts a target user to perform processing without publishing the document (S104). The target user is a user relating to a document which does not satisfy the specific condition, for example, in a case where the user A creates and uploads the document a, the user B creates and uploads the document b, and the user C creates and uploads the document c, when the document c does not satisfy the specific condition, the user C relating to the document c is the target user. In a case where the specific condition of the document c is uploaded and the document c is not upgraded yet, the control device 141 prompts the user C by notifying, for example, "document c is not upgraded yet" or the like by mail.

After prompting the target user, in a case where an event occurs in a document which does not satisfy the specific condition (publication condition) (S105), the control device 141 reconfirms the status of all the documents and determines whether or not all the documents satisfy the specific condition (S106). In a case where all the documents satisfy the specific condition such as an upgrade of the document c ("satisfied" in S106), all the documents in the folder 146 are published by mail transmission to a user of a publication destination (S107). In a case where the specific condition is not satisfied yet ("not satisfied" in S106), the processing after S104 is repeatedly performed.

Figure 4:
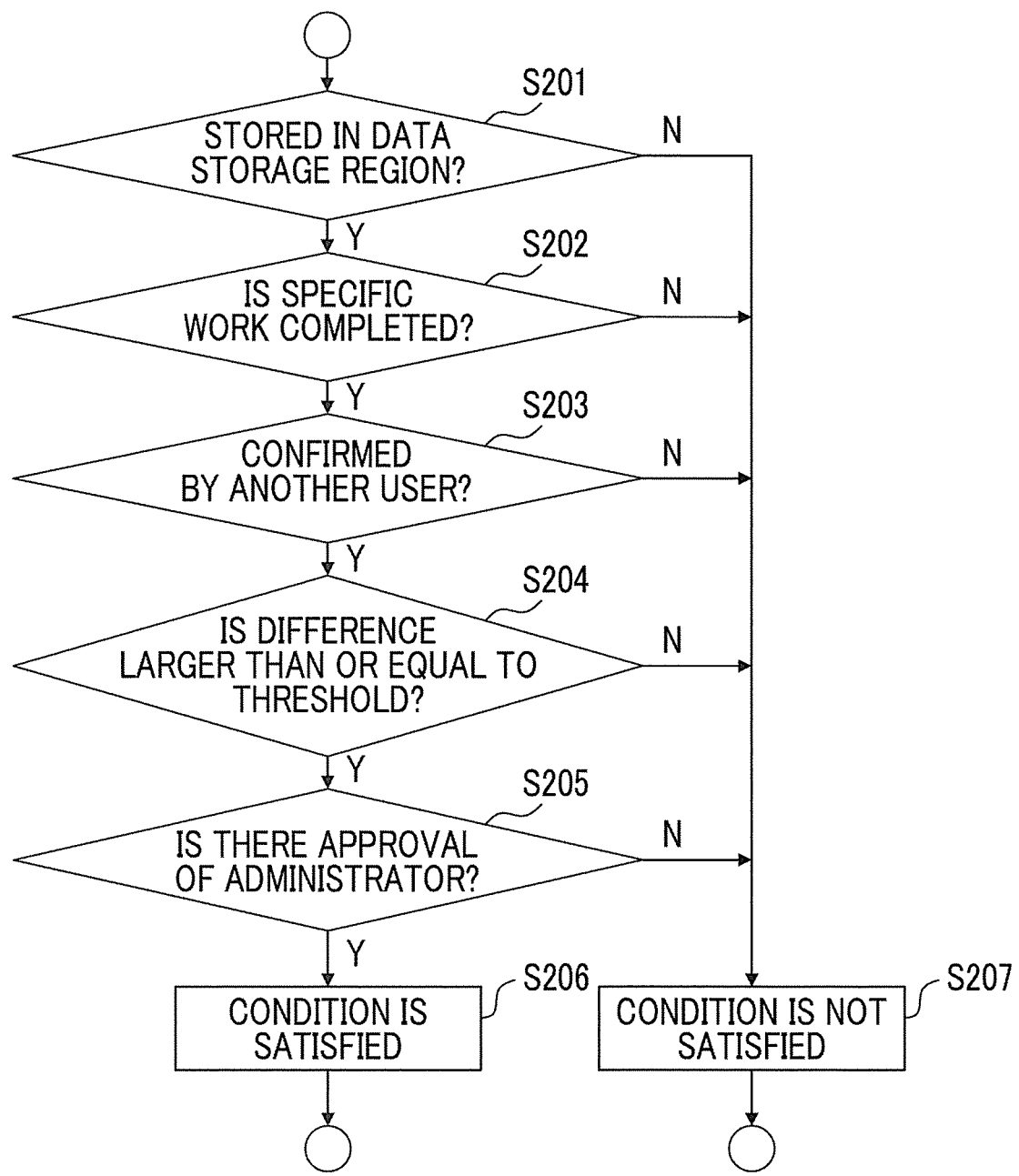
FIG. 4 is a processing flowchart (second) of the embodiment.

FIG. 4 illustrates a detailed flowchart of the status confirmation processing of S103 or S106 in FIG. 3. The status confirmation processing can change depending on the specific condition set for each document. In FIG. 4, following conditions may be set for all the documents in the publication reservation setting processing in S102 of FIG. 3 as a specific condition.

A document is stored in the folder 146 (S201)
A specific work is completed for the document (S202)
A document is confirmed by another user (S203)
A difference in version before and after the document is upgraded is larger than or equal to a threshold (S204)
There is an approval of an administrator (S205)

The control device 141 determines whether or not all the conditions are satisfied for each document, and determines that the condition is satisfied in a case where all the documents are satisfied (S206), and determines that the condition is not satisfied when the condition is not fascinated in at least one of the documents (S207).

In FIG. 4, in a case where an upgrade is not set in a certain document as a specific condition, the processing of S204 can be skipped for the document. In addition, the upgrade may be included or a specific addition may be made to a specific location of a document, as the specific work of S202. In a case where the specific work is upgraded, it is determined that the specific condition is satisfied by not only upgrading a version but also upgrading the necessary amount (determined by a threshold) by the processing of S202 and the processing of S204. A confirmation by another user in S203 and an approval of the administrator in S205 may be alternatively processed. That is, in a case where the processing of S203 is performed, the processing of S205 is not required, and in a case where the processing of S203 is not performed, the processing of S205 is performed.

When confirming the status of all the documents, the control device 141 may calculate a progress rate for each document for all users related to all the documents in addition to the progress rate in the folder 146 unit and transmit the calculated progress rate to the user terminal.

Specifically, in a case where the user A creates and uploads the document a, the user B creates and uploads the document b, and the user C creates and uploads the document c, in a case where the documents a and b are YES in all the determination processing of S201 to S205 and the document c is NO only in the processing of S205, the progress rate of the folder 146 unit is 66% (two documents of three documents a, b, and c satisfy the condition), and the document a=100%, the document b=100%, and the document c=80% as the progress rate for each document. In a case where FIG. 2 used as an example, the control device 141 calculates the progress rate for each folder 146 unit and each document and transmits data of the calculated progress rate to the user terminal 10-1, the user terminal 10-2, and the user terminal 10-3. Thereby, the user C can grasp that the specific condition is not satisfied for the document c of the user C, and the other users A and B can also grasp that a progress of the user C is delayed.

The control device 141 may transmit the specific condition associated with each document to the user terminals 10 and 12 in response to a request from the user. Thereby, the user can reconfirm the specific condition associated with the document that the user has to upload.

Next, a screen example displayed on the user terminal 10 will be specifically described.

Figures 5, 6:
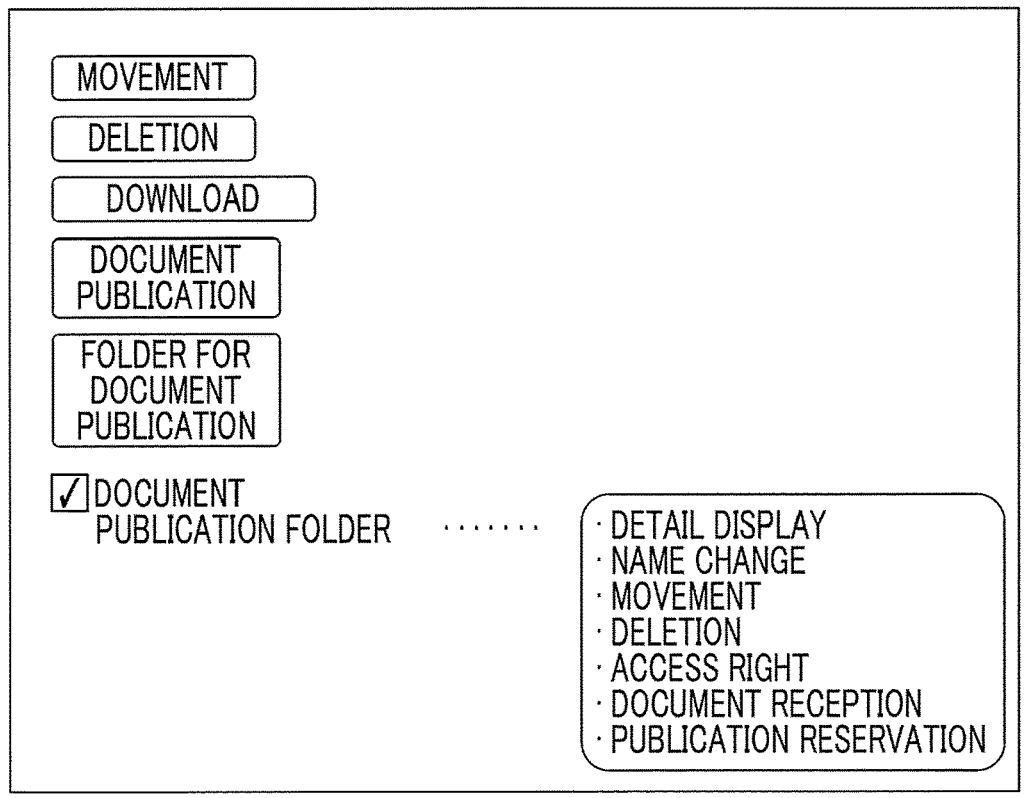
FIG. 5 is a screen example (first) of the embodiment.
FIG. 6 is a screen example (second) of the embodiment.

FIG. 5 is a setting screen of a publication reservation displayed on a display device of the user terminal 10. The screen is displayed by starting a specific application program or logging in to the shared server 14 by starting the application program operating on a web browser.

Respective buttons of movement, deletion, download, document publication, and publication reservation are displayed on the left side of the screen as various menus. In a case where a publication reservation is made for a certain folder stored in the storage device 145, the user operates the "publication reservation" button and checks a folder for a document publication to specify a folder to be published. In a case where a document publication folder is operated (touch or right-click by a mouse), a pop-up menu is displayed, and following various menus are displayed.

Detail display
Name change
Movement
Deletion
Access right
Document reception
Publication reservation As the user selects the "publication reservation", the screen is shifted to a setting screen of the publication reservation for the document publication folder.

FIG. 6 is a setting screen example of the publication reservation. An input field for inputting a name of the document publication folder is displayed, and all documents in the folder are displayed as a publication reservation document list. In a case where the user operates to select one of the documents which displayed as the list (such as a right click), a pop-up menu is displayed, and following various menus are displayed.

Publication setting
Excluding from publication target

In a case where the user selects the "publication setting", the screen shifts to a screen for setting a specific condition for a document, that is, a publication condition for publishing the document.

In addition, an input field for inputting a publication request date and a publication deadline date of all the documents in the field are displayed. As the user inputs the items, the publication request date and the publication deadline date can be set. The publication request date is a date when the user desires to publish and is a date when it is desirable that the document can be published because all the documents satisfy the specific condition until that date. In a case where there is a document that does not satisfy the specific condition on the publication request date, the control device 141 can transmit a reminder notification to the user relating to the document.

FIG. 7 is a screen example displayed in a case where the user operates the "publication setting" in FIG. 6. An input field for inputting a document publication destination, a publication condition, and a transmission mail name is displayed. The document publication destination is input by adding from an address book, adding from a history list, adding a mail address, or the like. The publication condition is input by selecting an action target user and action content. The action target user is a user as a subject who has to execute the specific condition, and the action content is content of the specific condition. The figure illustrates a configuration in which presence or absence of a final check of an administrator is input as the publication condition separately from the action content, but the final check of the administrator may be included as one of the action contents. The transmission mail name can be randomly input. For example, the name is "a document is published by Mr. Fuji Taro". In a case where all the documents in the folder satisfy the specific condition, the document is transmitted to the mail address designated in the document publication destination by mail to be published, but the name input here as the transmission mail name at that time is displayed.

FIG. 8 is a screen example displayed in a case where the "action content" is operated in FIG. 7. A plurality of specific conditions are displayed in a list, and the user can set the specific conditions by checking the specific conditions as appropriate. The specific conditions include the following.

Version upgrade
Content difference
Approval mark
Review status

The version upgrade indicates that a document is upgraded by a user. The content difference indicates that a difference in content before and after the version upgrade is greater than or equal to a threshold. The approval mark indicates that an approval mark of an administrator or the like exists. The approval mark is different from the final check of the administrator as the publication condition in FIG. 7. The review status indicates that there is a confirmation by another user other than a user relating to the document.

It is assumed that all of the specific conditions described above are set and that the final check of the administrator is set for the document a created and uploaded by the user A. In this case, the control device 141 determines that the document a satisfies the specific condition in a case where the version is upgraded, the content difference before and after the upgrade is greater than or equal to the threshold, the approval mark of the administrator is pressed, confirmation works of other users, for example, the user B and the user C are completed, and data indicating that there is the final check of the administrator is added to the document a, in the document a.

In a case where the control device 141 determines that the version is upgraded, and the content difference before and after the upgrade is greater than or equal to the threshold, the approval mark of the administrator is pressed, and confirmation works of other users, for example, the user B and the user C are completed, in the document a, the control device notifies the administrator terminal of a gist thereof, and the final check of the administrator is performed by operating the administrator terminal by the administrator received the notification to perform the final check and return the notification to the control device 141.

FIG. 9 is a screen example displayed on the user terminal 10 by being transmitted thereto in a case where the status of all the documents in the folder is confirmed by the control device 141. A publication reservation date, a publication deadline date, a publication deadline, and a progress rate are displayed for each folder. For example, in a case where there are three folders, the progress rates of the respective folders are displayed as 80%, 60%, 10%, and the like. The progress rate of the folder is calculated by following equation.

$$\text{Progress rate of folder} = (\text{number of satisfied documents})/(\text{number of all documents})$$

In a case where the progress rate of the folder is operated (right click or the like), the pop-up menu of the detail display is displayed, and in a case where this is operated, the screen shifts to the detail display screen of the progress rate for each document in the folder.

FIG. 10 is a screen example in a case where the detail display in FIG. 9 is operated. The progress rates of all the documents in the selected folder are displayed. For example, in a case where there are three documents, specific conditions (publication conditions) of the respective documents are displayed, and the progress rates thereof are displayed as completion, uncompletion, and the like. The completion indicates a case where all is satisfied, the uncompletion indicates a case where all is not satisfied.

Here, the displayed specific condition may be any one of what all the specific conditions set for each document are displayed, what only the satisfied specific conditions are displayed, and what only the unsatisfied specific conditions are displayed. In a case where the progress rate is complete, the specific condition may not be displayed, and in a case where the progress rate is not completed, only the unsatisfied specific condition may be displayed.

In FIG. 10, the progress rate is displayed as completion or uncompletion but may be displayed as a numerical value. The progress rate of the document is calculated by the following equation.

$$\text{Progress rate of document} = (\text{number of satisfied specific conditions})/(\text{number of all specific conditions})$$

In a case where a user operates the progress rate of the document, pop-up menus of the detail display and publication approval are displayed. The "publication approval" is operated, for example, in a case where the progress rate is completely changed, by determination of an administrator even in a case where the progress rate is uncompleted. In a case where you operate the "detail display", the screen is shifted to a screen which displays details of the status of the progress rate.

Figure 11:
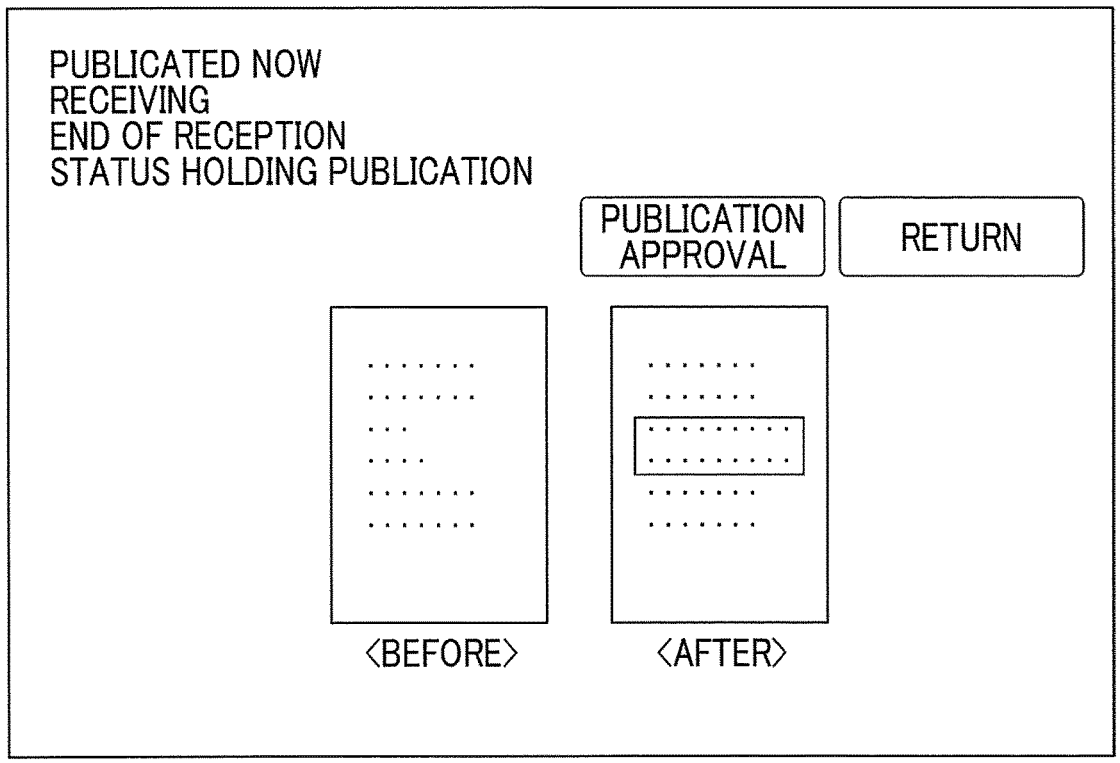
FIG. 11 is a screen example (seventh) of the embodiment.

FIG. 11 illustrates a detail screen example of the progress rate. Following conditions are set as specific conditions of a certain document, and this is an example of a case where a difference amount of version upgrade does not satisfy a threshold.

Version upgrade
Content difference

Images before and after a version upgrade of a target document are displayed in parallel, and a portion where the version is upgraded is highlighted with a black frame or the like. The user relating to the document or other users can grasp which part is upgraded to what extent.

As described above, although an embodiment of the invention is described, the invention is not limited to the embodiment, and various modifications can be made. Hereinafter, modification examples will be described.

Modification Example 1

In the embodiment, a specific condition for batch processing for the plurality of documents stored in the folder 146 of the storage device 145 is set, but a specific condition may be set previously for a storage scheduled document which is not stored yet in the folder 146.

Figure 12:
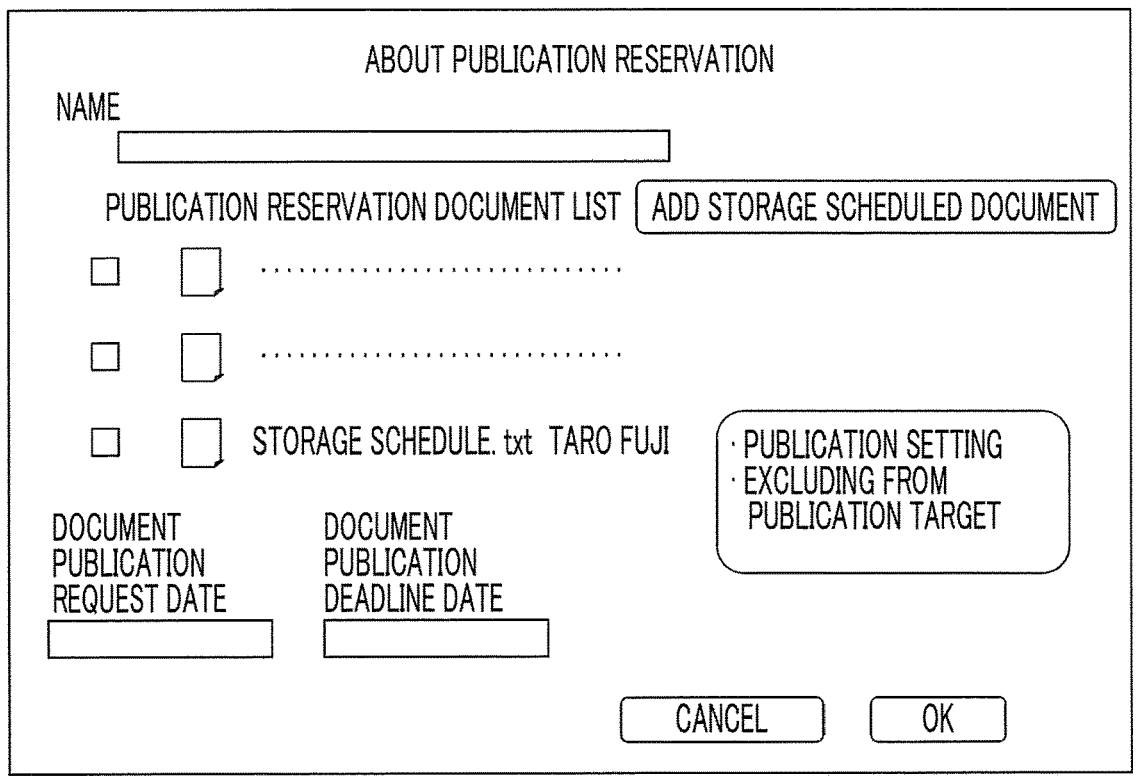
FIG. 12 is a screen example (first) of a modification example.

FIGS. 12 to 14 illustrate screen examples in a case where a specific condition is set for the storage scheduled document.

FIG. 12 is a screen example corresponding to FIG. 6, and in addition to FIG. 6, a button of "add storage scheduled document" is displayed. By operating this button, a user can add a document to be stored to a publication reservation document list in addition to the stored document. The figure illustrates that a document "storage schedule. Txt" is added.

FIG. 13 illustrates a screen example displayed in a case where the button of "add storage scheduled document" in FIG. 12 is operated. An input field for inputting a file name of the storage scheduled document is displayed, and various buttons for inputting a user who will store the document are displayed.

FIG. 14 illustrates a screen example displayed on a user terminal operated by a user specified as the user who is scheduled to store the document in FIG. 13. By inputting a file name and operating a "registration" button, the document is transmitted to the shared server 14 and is stored in a designated folder. The file name is set to be the same as the file name designated in FIG. 13. Since this stores the specific condition in association with the file name of the document scheduled to be stored, in a case where the file name of the document scheduled to be stored and the file name of an actually uploaded document are different from each other, association with the specific condition is damaged.

Modification Example 2

In the embodiment, a version upgrade and the like of a document is exemplified as a specific condition for performing batch processing, but whether or not an operation for limiting update or deletion for the uploaded document is performed as the specific condition (hereinafter, this is referred to as "check-out") may be included. By performing the check-out, browsing and downloading can be performed in which an editing work such as updating the document is prevented. Whether or not an operation for releasing a limitation state of updating or deleting the uploaded document is performed (hereinafter, this is referred to as "check-in") may be included as the specific condition. By performing the check-in, it is possible to perform review and comment addition by another user, to stamp an approval mark by the administrator, and to perform editing at a publication destination.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a communication interface that receives a plurality of pieces of data;
   a user terminal that provides for each piece of data which is received or scheduled to be received by the communication interface, a specific condition, respectively;
   a memory that stores the specific condition provided by the user terminal in association with each piece of the data which is received or scheduled to be received by the communication interface; and
   a processor that performs batch processing of a plurality of pieces of data in a case where each of the plurality of pieces of data received by the communication interface satisfies the corresponding specific condition stored in the memory,
   wherein each piece of the data is a document file, an image file or a video file,
   wherein the batch processing is not performed in a case at least one of the data does not satisfy the corresponding specific condition,
   wherein the corresponding specific condition is different between each of the plurality of pieces of data.

2. The information processing apparatus according to claim 1,
   wherein the corresponding specific condition is that the data is received by the communication interface and is stored in a data storage region.

3. The information processing apparatus according to claim 1,
   wherein the corresponding specific condition is that a specific work is completed by a specific user.

4. The information processing apparatus according to claim 1,
   wherein the corresponding specific condition is that a specific work is completed by a specific user and is confirmed by another user.

5. The information processing apparatus according to claim 3,
   wherein the specific work is a limitation operation of updating or deleting data by the specific user.

6. The information processing apparatus according to claim 3,
   wherein the specific work is an operation of releasing a limitation state of updating or deleting data by the specific user.

7. The information processing apparatus according to claim 3,
   wherein the specific work is a notification of a work completion by the specific user.

8. The information processing apparatus according to claim 3,
   wherein the specific work is a version upgrade by the specific user.

9. The information processing apparatus according to claim 1,
   wherein the corresponding specific condition is a specific addition to data that is received by the communication interface and is stored in a data storage region.

10. The information processing apparatus according to claim 9,
wherein the specific addition is an update more than or equal to a threshold.

11. The information processing apparatus according to claim 1, wherein the processor, after each of the plurality of pieces of data satisfies each of the specific condition, notifies an administrator
wherein the processor performs batch processing in a case where a confirmation is received from the administrator who receives the notification from the processor.

12. The information processing apparatus according to claim 1,
wherein the corresponding specific condition is that the data, received by the communication interface, is stored in a data storage region until a specific date after the data is stored in the data storage region.

13. The information processing apparatus according to claim 1,
wherein the processor performs a control such that whether or not each of the plurality of pieces of data satisfies the corresponding specific condition is displayed on the user terminal.

14. The information processing apparatus according to claim 1, wherein the processor performs a control such that the corresponding specific condition is displayed for each of the plurality of pieces of data.

15. The information processing apparatus according to claim 1, wherein the processor performs a control such that collective progress of the plurality of pieces of data as a whole are displayed.

16. The information processing apparatus according to claim 13, wherein the processor notifies a user, who is going to provide the reception unit with data which does not satisfy the corresponding specific condition among the plurality of pieces of data.

17. The information processing apparatus according to claim 1, wherein the processor performs a control such that the corresponding specific condition for each piece of data is displayed.

18. The information processing apparatus according to claim 1,
wherein the batch processing is at least one of a data transmission, a data encryption, a data decryption, a data format change, a data edition, a data compression, or a data decompression.

19. The information processing apparatus according to claim 2,
wherein the batch processing is at least one of a data transmission, a data encryption, a data decryption, a data format change, a data edition, a data compression, or a data decompression.

20. A non-transitory computer readable medium storing a program causing a computer to operate as
a communication interface that receives a plurality of pieces of data;
a user terminal that provides for each piece of data which is received or scheduled to be received by the communication interface, a specific condition, respectively;
a memory that stores the specific condition provided by the user terminal in association with each piece of the data which is received or scheduled to be received by the communication interface; and
a processor that performs batch processing of the plurality of pieces of data in a case where each of the plurality of pieces of data received by the communication interface satisfies the corresponding specific condition stored in the memory,
wherein each piece of the data is a document file, an image file or a video file, whereinthe batch processing is not performed in a case at least one of the data does not satisfy the corresponding specific condition,
wherein the corresponding specific condition is different between each of the plurality of pieces of data.

* * * * *